(12) United States Patent
Seidlhuber

(10) Patent No.: US 7,128,188 B2
(45) Date of Patent: Oct. 31, 2006

(54) ELEVATING TRUCK PLATFORM, IN PARTICULAR FORK ELEVATING TRUCK PLATFORMS

(75) Inventor: Alwin Seidlhuber, Alsfeld (DE)

(73) Assignee: Franz Kahl GmbH, Lauterbach (DE)

( * ) Notice: Subject to any disclaimer, the term of this patent is extended or adjusted under 35 U.S.C. 154(b) by 148 days.

(21) Appl. No.: 10/854,796

(22) Filed: May 27, 2004

(65) Prior Publication Data
US 2005/0045860 A1 Mar. 3, 2005

(30) Foreign Application Priority Data
Jun. 11, 2003 (DE) ................................ 103 26 708

(51) Int. Cl.
*B66F 9/06* (2006.01)
(52) U.S. Cl. ...................... 187/222; 187/224; 187/226; 187/229; 187/231; 280/43.12
(58) Field of Classification Search ................ 187/222, 187/224, 226, 231
See application file for complete search history.

(56) References Cited
U.S. PATENT DOCUMENTS

| | | | | |
|---|---|---|---|---|
| 2,996,178 A | * | 8/1961 | Forrest | ........................ 206/405 |
| 3,567,240 A | * | 3/1971 | Brassington | ............. 280/43.12 |
| 3,817,546 A | * | 6/1974 | Sugiura | .................... 280/43.12 |
| 4,589,669 A | * | 5/1986 | Kedem | ..................... 280/43.12 |
| 6,022,183 A | * | 2/2000 | Walters et al. | .............. 414/607 |

FOREIGN PATENT DOCUMENTS

DE 2212292 11/1972

\* cited by examiner

*Primary Examiner*—Kathy Matecki
*Assistant Examiner*—Terrell Matthews
(74) *Attorney, Agent, or Firm*—Crowell & Moring LLP

(57) ABSTRACT

A lifting truck such as a forklift truck which can be provided with a supply container which is especially easy to build. To this end, space is made on a carrier between a lifting device for the lifting platform of the forklift truck, a pump and two U-shaped guards. The supply container is arranged in this space. Since it lies there protected, there is no danger of impact-like stresses so that the supply container can be made of a relatively light-weight plastic, a feature that significantly simplifies both the production and also the assembly.

10 Claims, 3 Drawing Sheets

ELEVATING TRUCK PLATFORM, IN PARTICULAR FORK ELEVATING TRUCK PLATFORMS

The invention relates to a lifting truck, in particular a forklift truck with an undercarriage and a lifting platform, the purpose of which is to receive loads and which is vertically adjustable in relation to the undercarriage for lifting received loads; wherein between the undercarriage and a head of the lifting platform there is a hydraulic lifting device, which comprises a lift cylinder and a lift piston, guided therein; wherein the lift chamber, defined by the lift piston in the cylinder, is connected to the pressure side of a hydraulic pump, which can be actuated by means of a pole by hand or by means of a motor, and to the suction side of which is attached hydraulically a supply container; wherein the pump is mounted on one side of the lifting device on a carrier, projecting from the side of the lift cylinder.

A lifting truck of the class described above, wherein the pump can be manually operated by means of its pole, is described in the DE 22 12 292 C3. The supply container is a ring chamber, enveloping the lift cylinder.

Even though this construction is very frequently encountered, it has, nevertheless, the drawback that the supply container is mounted relatively exposed. To prevent it from being damaged during the rough usage of the lifting truck, it is made of metal. The consequence is that the supply container is relatively heavy; and its construction can be realized only very expensively.

Therefore, the invention is based on the problem of providing a forklift truck with a supply container, which can be constructed as simply as possible and especially light weight and which, nevertheless, is suitable for the deployment conditions of a forklift truck.

To solve this problem, the invention provides that a lifting truck, according to the preamble of claim 1, exhibits a supply container above the carrier between the pump and the lifting device.

This arrangement has the advantage that the supply container can be made of plastic. Such containers can be realized relatively easily and economically by means of the injection molding process. Owing to the arrangement of the supply container between the pump and the lifting device it is relatively protected, so that it cannot be expected that the supply container will be exposed to impact, which would result in its being damaged.

The protection of the supply container against the effect of exposure to impact can be improved by providing two U-shaped guards on the sides of the carrier that enclose the supply container on the sides. The pole of the lifting truck is pivot-mounted on the upper ends of the U-shaped guard that project over the supply container. Thus, the U-shaped guards have two functions. On the one hand, they serve to protect the supply container; and, on the other hand, an especially simple and economical arrangement for the swivel mounting of the pole is provided.

To protect the supply container also from the top, there is a top rail, which connects together the two U-shaped guards and extends over the supply container. Furthermore, it serves to reinforce the bearing construction, formed by the U-shaped guards, for the pole. In addition, the top rail can function as a stop for the pole, when it is set vertically.

For optimum utilization of the space between the lift cylinder, the pump and the two U-shaped guards, the supply container lies flush against the lifting device. To this end, its underside has a step, with which it sits on the upper edge of the lift cylinder. In addition, the supply container has on its side, facing the lifting device, a depression that is adapted to the contour of the lift piston.

To be able to produce the connection of the supply container to the pump, one proceeds as follows. The supply container has a bottom connecting lug, which is inserted into a socket in the carrier, the socket being connected to the pump by means of a borehole in the carrier.

To guarantee that the supply container is held reliably on the carrier, the supply container is screwed together with the carrier. To this end, a fastening screw exhibits a longitudinal borehole. It is guided through the floor of the connecting lug and screwed into a thread on the carrier. In this case the longitudinal borehole in the fastening screw forms the hydraulic connection between the supply container and the borehole in the carrier. To seal the connection, a gasket is located below the head of the fastening screw.

To be able to reach the screw during assembly, it is provided that the refill opening is located above the connecting lug, so that the appropriate assembly tool can be guided through said connecting lug to the screw.

The invention is explained in detail below with reference to one embodiment.

Figure 1:
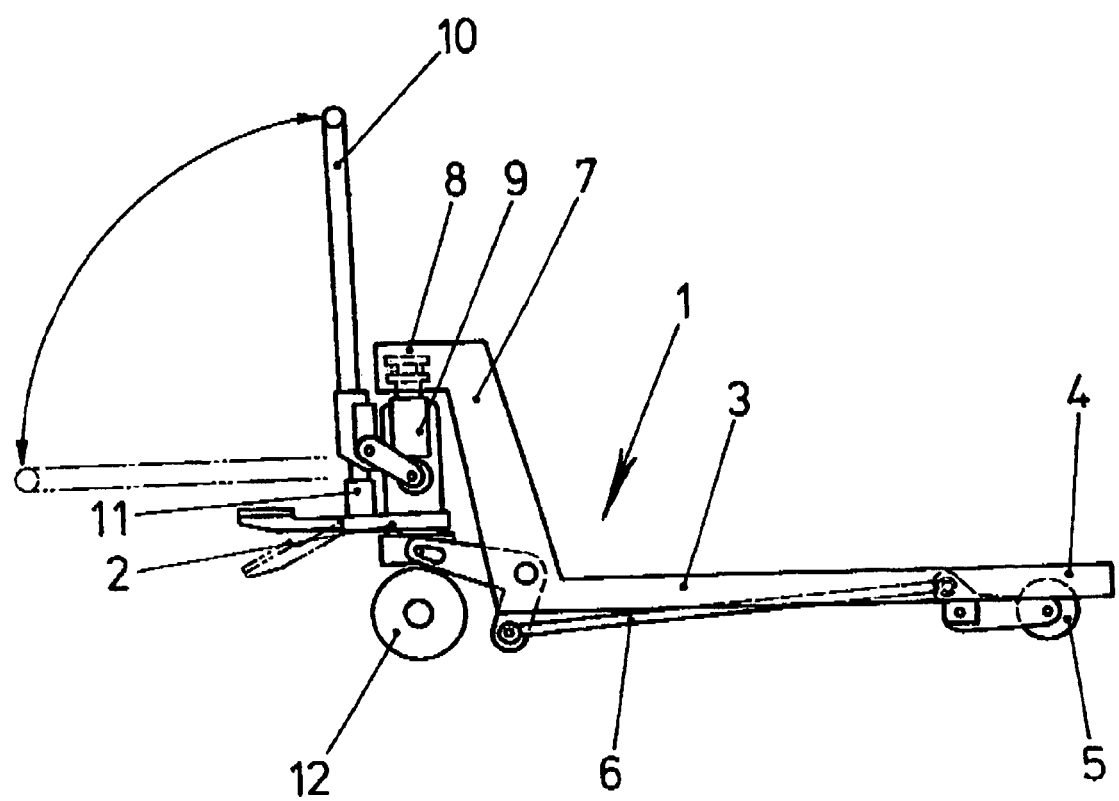
FIG. 1 is a side view of a typical forklift truck with a hydraulic lifting device, which is connected to a manually operated pump.

First, reference is made to FIG. 1. It shows a typical forklift truck 1 with an undercarriage 2 and a lifting platform 3. According to this figure, the lifting platform 3 comprises two forks 4, which can be driven into the matching recesses of a Euro pallet. On the front ends of the forks 4 there is a supporting wheel 5, which is folded away downwards by means of a linkage 6 when the lifting platform 3 is raised. The rear ends of the forks 4 are connected to a head 8 by means of a brace 7. On the undercarriage 2 there is a lifting device 9, on which the head 8 of the lifting platform 3 lies; and there is a pole 10, which can be pivoted in a vertical plane and with which a hydraulic pump 11, which is connected to the lifting device 9, can be operated.

Furthermore, the undercarriage 2 exhibits a pair of wheels 12, which are coupled to the pole in such a manner that the forklift truck 1 can be steered by moving the pole sideways.

Figure 2:
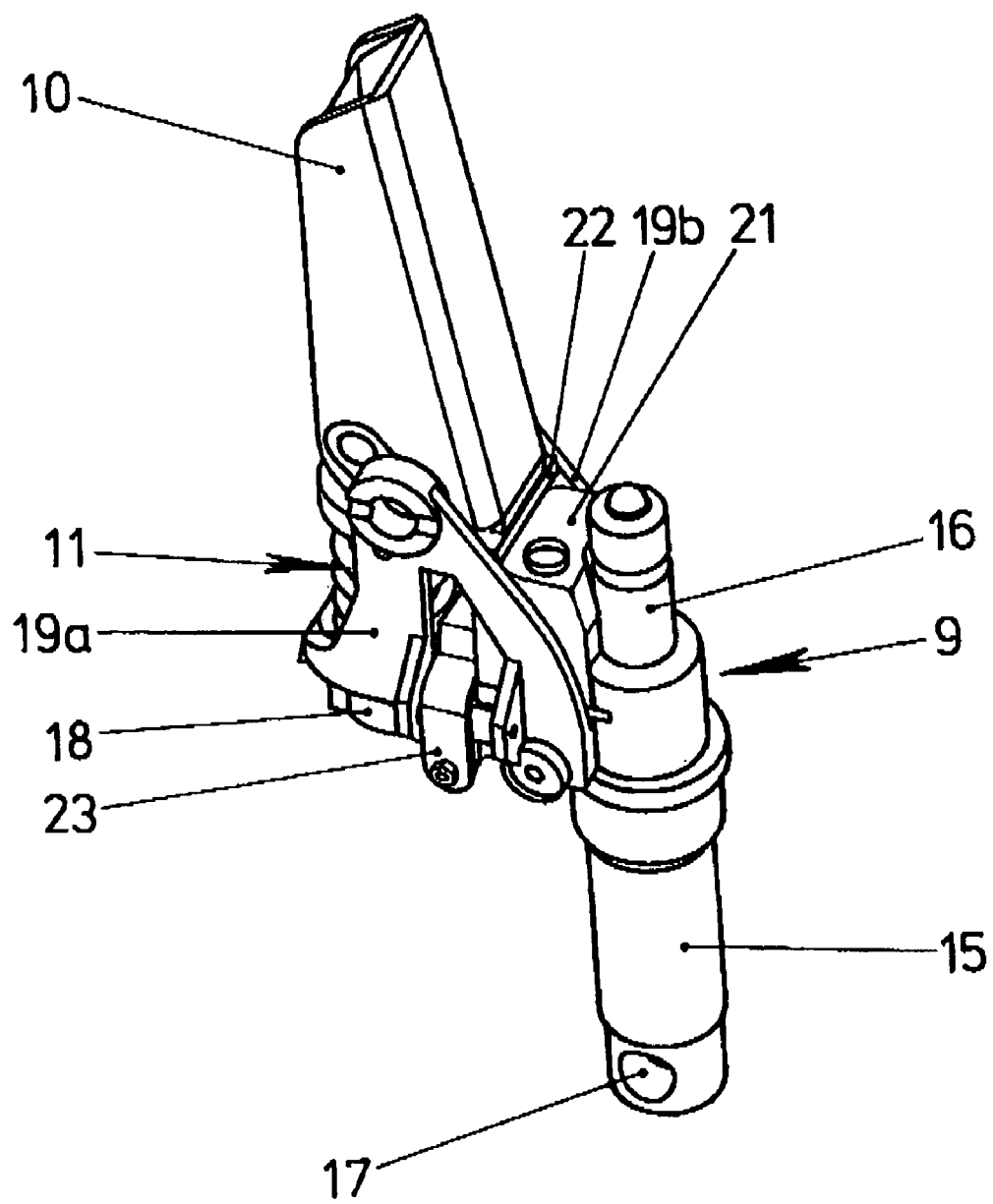
FIG. 2 is a perspective view of the lifting device and the pump.

FIG. 2 shows in detail the lifting device 9 with the pump. The lifting device 9 comprises a lift cylinder 15, in which the lift piston 16 is guided sealingly. The head 8 of the lifting platform 3 lies on the end of the lift piston 16 that projects beyond the lift cylinder 15. On the bottom end of the lift cylinder 15 there is a bearing 17 for the axle of the pair of wheels 12.

A carrier 18 projects from the side of the upper end of the lift cylinder 15. A U-shaped guard 19a, 19b is fastened to each of the two sides of the carrier. On the end of the carrier 18 that faces away from the lift cylinder 15 there is a pump 11, which can be operated by the pole 10, which is pivot-mounted on the upper ends of the U-shaped guards 19a, 19b. When the pole 10 is swung downwards, the pump pumps the pressure medium through the boreholes (which are not illustrated here in detail) in the carrier 18 and in the lift cylinder 15 into the lift chamber of the lift cylinder 15. In so doing, the lift piston 16 is moved out of the lift cylinder 15, and the lifting platform 3 rises. Enclosed on all sides by the two U-shaped guards 19a, 19b, the plastic supply container 21 is located between the lift cylinder 15 and/or the lift piston 16, on the one side, and the pump 11, on the other side. Above the supply container 21 there is a top rail 22, which connects together the two U-shaped guards 19a, 19b. As one can see from the drawing, the supply container 21 is enclosed by various components and, therefore, protected so that it cannot be expected that it will be damaged by the effect of exposure to impact.

Between the supply container 21 and the pump 11 there is a lever 23, which serves to control a valve, which is not shown here in detail. When the valve is opened by actuating the lever 23, the pressure medium flows from the lift chamber directly into the supply container 21, so that the lift piston 16 is lowered.

Figure 3:
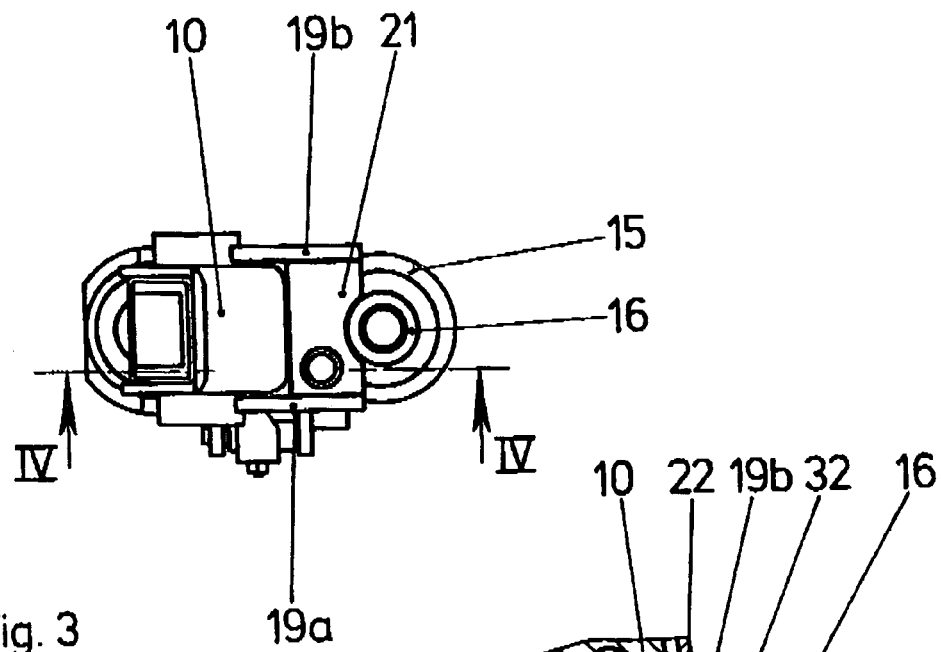
FIG. 3 is a top view of the lifting device and the pump.

The arrangement of the supply container 21 also follows once again from FIG. 3. One can see once again the arrangement of the supply container 21 between the lifting device, on the one side, and the pump 11, on the other side.

Figure 4:
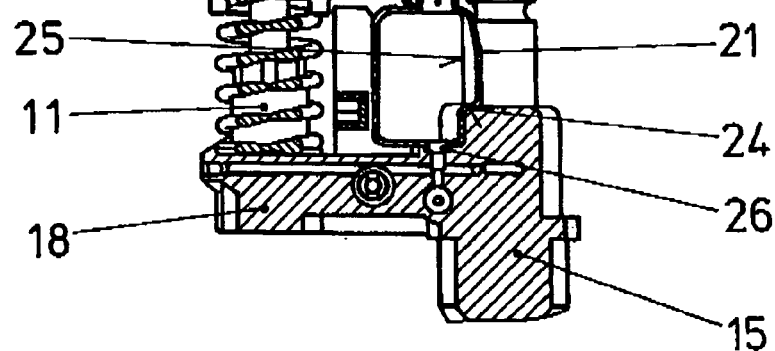
FIG. 4 is a view along the line IV—IV in FIG. 3.

As FIG. 4 shows, the container lies flush against the lift cylinder 15 and the lift piston 16 for optimal utilization of the space. To this end, the container has a step 24 on its underside, with which it sits on the upper end of the lift cylinder 15. The wall, which faces the lift piston 16, has a depression 25 that matches the contour of the lift piston 16.

Figure 5:
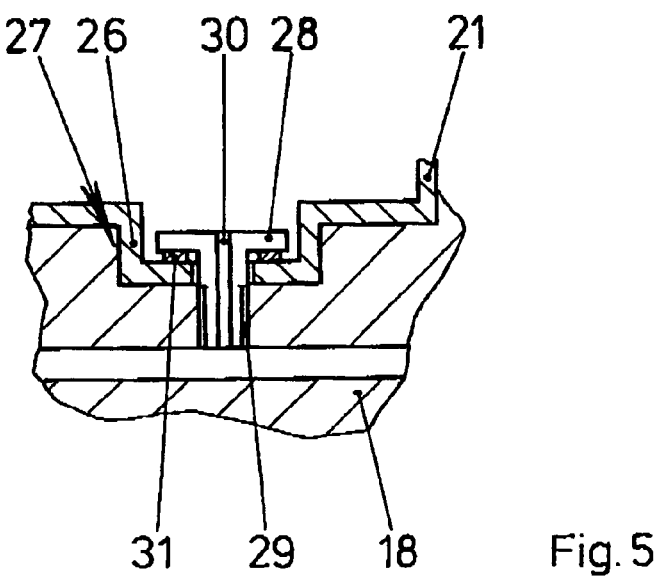
FIG. 5 is a detail view of the attachment of the supply container.

On the floor of the supply container 21 there is a connecting lug 26, which is inserted into a matching depression 27 on the upper side of the carrier 18. This layout is shown in detail once again in FIG. 5. A screw penetrates the floor of the lug 26 and is screwed into a matching thread in the carrier, so that the supply container is fastened to the carrier. In the fastening screw 28 there is a longitudinal channel 30, which produces the connection between the supply container and the boreholes. To seal the connection, there is a gasket 31 below the head of the fastening screw. To be able to screw in the screw, the lug 26 is located below the refill opening 32 of the supply container 21, so that to tighten or loosen the screw, the tool can be guided through this opening to the screw.

LIST OF REFERENCE NUMERALS 1 forklift truck
2 undercarriage
3 lifting platform
4 fork
5 supporting wheels
6 linkage
7 brace
8 head
9 lifting device
10 pole
11 pump
12 pair of wheels
13
14
15 lift cylinder
16 lift piston
17 bearing
18 carrier
19a, 19b U-shaped guards
21 supply container
22 top rail
23 lever
24 step
25 depression
26 connecting lug
27 socket
28 fastening screw
29 thread
30 longitudinal borehole
31 gasket
32 refill opening

The invention claimed is:

1. A lifting truck having an undercarriage and a lifting platform to receive loads and which is vertically adjustable in relation to the undercarriage; wherein between the undercarriage and a head of the lifting platform there is a hydraulic lifting device which comprises a lift cylinder and a lift piston guided therein; wherein the lift chamber, defined by the lift piston in the cylinder, is connected to the pressure side of a hydraulic pump which can be actuated by means of a pole by hand or by means of a motor, and to the suction side of which is attached hydraulically a supply container; wherein the pump is mounted on one side of the lifting device on a carrier projecting from the side of the lift cylinder, wherein the supply container is arranged above the carrier and between the pump and the lifting device.

2. A lifting truck, as claimed in claim 1, further comprising U-shaped guards fastened on both sides of the carrier wherein, the pole is pivot-mounted on the upper ends of the U-shaped guards, the U-shaped guards enclosing the supply container on the sides.

3. A lifting truck, as claimed in claim 2, wherein the U-shaped guards are connected together by means of a top rail which extends over the supply container.

4. A lifting truck, as claimed in claim 3, wherein the top rail acts as a stop for the pole when it is set vertically.

5. A lifting truck, as claimed in any one of claims 1 to 4, wherein the supply container has, on its underside, a step with which it sits on the upper edge of the lift cylinder, and the supply container has on its side facing the lifting device a depression adapted to the contour of the lift piston.

6. A lifting truck, as claimed in any one of claims 1 to 4, wherein the supply container has a bottom connecting lug and a socket for receiving the connecting lug is formed in the carrier.

7. A lifting truck, as claimed in claim 6, wherein a hydraulic connection between the supply container and a borehole in the carrier is produced by means of a longitudinal borehole in a fastening screw, which serves to fasten the supply container to the carrier, to which end the fastening screw is guided through the floor of the connecting lug and is screwed into a thread on the carrier.

8. A lifting truck, as claimed in claim 7, the supply container has a refill opening above the connecting lug.

9. A lifting truck, as claimed in claim 5, wherein the supply container has a bottom connecting lug and a socket for receiving the connecting lug is formed in the carrier.

10. A lifting truck, as claimed in claim 9, wherein a hydraulic connection between the supply container and a borehole in the carrier is produced by means of a longitudinal borehole in a fastening screw, which serves to fasten the supply container to the carrier, to which end the fastening screw is guided through the floor of the connecting lug and is screwed into a thread on the carrier.

* * * * *